(12) United States Patent
Lindoff et al.

(10) Patent No.: US 8,526,377 B2
(45) Date of Patent: Sep. 3, 2013

(54) DRX FUNCTIONALITY IN MULTI-CARRIER WIRELESS NETWORKS

(75) Inventors: Bengt Lindoff, Bjärred (SE); Stefan Parkvall, Stockholm (SE); Erik Dahlman, Bromma (SE)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 228 days.

(21) Appl. No.: 12/934,207

(22) PCT Filed: Sep. 3, 2008

(86) PCT No.: PCT/SE2008/050991
§ 371 (c)(1),
(2), (4) Date: Feb. 7, 2011

(87) PCT Pub. No.: WO2009/120124
PCT Pub. Date: Oct. 1, 2009

(65) Prior Publication Data
US 2011/0128925 A1    Jun. 2, 2011

Related U.S. Application Data

(60) Provisional application No. 61/039,207, filed on Mar. 25, 2008.

(51) Int. Cl.
*H04W 4/00* (2009.01)
*H04B 7/005* (2006.01)
(52) U.S. Cl.
USPC .......................................... 370/329; 370/278
(58) Field of Classification Search
USPC ................. 370/278, 282, 328, 329, 338, 464, 370/465
See application file for complete search history.

(56) References Cited

U.S. PATENT DOCUMENTS

| | | | |
|---|---|---|---|
| 7,020,477 B2* | 3/2006 | Cramby et al. | 455/458 |
| 7,916,675 B2* | 3/2011 | Dalsgaard et al. | 370/311 |
| 7,957,360 B2* | 6/2011 | Suzuki et al. | 370/341 |
| 8,238,260 B2* | 8/2012 | Terry et al. | 370/252 |
| 2008/0186892 A1* | 8/2008 | Damnjanovic | 370/311 |

(Continued)

FOREIGN PATENT DOCUMENTS

| EP | 1 845 668 | 10/2007 |
|---|---|---|
| EP | A 1 845 668 | 10/2007 |

(Continued)

OTHER PUBLICATIONS

International Search Report for PCT/SE2008/050991, mailed Jan. 29, 2009.

(Continued)

*Primary Examiner* — Warner Wong
(74) *Attorney, Agent, or Firm* — Nixon & Vanderhye P.C.

(57) ABSTRACT

Mechanisms to provide independent DRX (discontinuous reception) functionalities for individual carriers of a multi-carrier wireless network (200) are described. DRX is a higher layer functionality indicating which TTIs (transmission time intervals) a user equipment (220) needs to read for control signals. Operating in the DRX cycle allows the user equipment (220) to reduce battery consumption. A connection is established between a base station (210) and the user equipment (220) over a plurality of carriers, where for each carrier, an independent DRX cycle is established. The plurality of carriers include anchor carriers which can carry commands from the base station (210). The anchor carriers have shorter DRX cycles than the non-anchor carriers. When a large amount of download data is to be transferred, the DRX cycles of multiple carriers are overridden and used for transfer to achieve fast download rates. The override commands are sent from the base station (210) to the user equipment (220) prior to the transfer.

25 Claims, 10 Drawing Sheets

(56) References Cited

U.S. PATENT DOCUMENTS

2008/0293426 A1 11/2008 Kim
2009/0232118 A1* 9/2009 Wang et al. .................. 370/338

FOREIGN PATENT DOCUMENTS

| WO | WO 2007/073118 | 6/2007 |
| WO | 2007/148198 | 12/2007 |
| WO | WO 2007/148198 | 12/2007 |

OTHER PUBLICATIONS

International Preliminary Report on Patentability and Written Opinion for International Application No. PCT/SE2008/050991 mailed Sep. 28, 2010.

* cited by examiner ized as U.S. 8,526,377 B2

DRX FUNCTIONALITY IN MULTI-CARRIER WIRELESS NETWORKS

This application is the U.S. national phase of International Application No. PCT/SE2008/050991, filed 3 Sep. 2008, which designated the U.S. and claims priority to U.S. Application No. 61/039,207, filed 25 Mar. 2008, which are hereby incorporated by reference.

TECHNICAL FIELD

The disclosed technology relates to discontinuous reception functionalities for use in communications between a user equipment and a base station in a multi-carrier wireless network.

BACKGROUND

Evolution of cellular systems promise significant data rate increase in the future, to 1 Gb/s and higher. Higher data rates typically require larger system bandwidths. For the IMT (International Mobile Telecommunications) advanced (i.e. the fourth generation mobile communication) systems, bandwidths up to 100 MHz are being discussed. Unfortunately, the radio spectrum is a limited resource and since many operators and systems need to share the same radio resource, finding a free 100 MHz contiguous spectrum is problematic.

One way to address this issue is to aggregate multiple narrow bandwidths (or component carriers) as illustrated in FIG. 1, which can be contiguous or non-contiguous to aggregately achieve the wide bandwidth. In the example of FIG. 1, a 50 MHz bandwidth spectrum is achieved by aggregating individual narrower bandwidth component carriers, which in this instance are 20 MHz, 20 MHz, and 10 MHz wide component carriers. One benefit of such a solution is that it is possible to generate sufficiently large bandwidth for supporting data rates up to and above 1 Gb/s. Furthermore, this solution also makes it possible to adapt the spectrum parts to various situations and geographical positions thus making such solution very flexible.

A straightforward evolution of current cellular systems, such as LTE (Long Term Evolution), to support contiguous and non-contiguous spectrum is to introduce multi-carriers. That is, for each spectrum "chunk" representing a "legacy LTE" system carrier, a "4G" user equipment can be made to be capable of receiving multiple number of LTE carriers of different bandwidths transmitted at different carrier frequencies.

Although this approach seems to be straightforward, it is a non-trivial task to design an LTE advanced capable user equipment. The aggregated spectrum approach implies that the radio receiver architecture for the user equipment will become more complicated than for a user equipment that is capable of only receiving small and contiguous system bandwidths. The reason is that the front end radio needs to be able to suppress blocking signals in between the spectrum "chunks". Different kinds of radio architecture can be used to handle this problem. However, they typically have drawbacks in terms of power consumption compared to standard continuous system bandwidth receivers.

SUMMARY

One aspect of the invention is to provide independent DRX (discontinuous reception) functionality on respective network carriers in a multi-carrier system. DRX is a higher layer functionality indicating which TTIs (transmission time intervals) the user equipment needs to read for control signals for possible reception of data and for time instants for channel quality indicator (CQI) measurements.

When in the DRX cycle, the user equipment can operate the receivers configured to listen for signals on the carriers such that each receiver is active for a predetermined amount of time (active duration) and is in a power conservation mode for another predetermined amount of time (inactive duration). This allows the user equipment to reduce battery consumption. A DRX cycle defines the length of the interval in which a combination of the active and inactive durations before the intervals repeat.

In one embodiment, the base station establishes a connection with the user equipment over a plurality of component carriers, or simply a plurality of carriers, where each carrier is capable of carrying signals (data and/or control) between the base station and the user equipment. For each carrier, the DRX cycle is established such that the DRX cycles of the carriers are independent of each other.

The plurality of carriers include one or more anchor carriers, i.e., carriers that carry control signals from the base station to the user equipment. The anchor carriers also carry commands from the base station instructing the user equipment to override the DRX cycles of the carriers. The override commands include commands to disable or to modify the DRX cycles of these carriers. It is preferred that the DRX cycles of the anchor carriers be shorter than the DRX cycles of the non-anchor carriers.

When a large amount of download data is to be transferred from the base station to the user equipment in a relatively short time frame, that is, when it is determined that a relatively fast download transfer rate is required, multiple carriers are selected for this purpose. By using multiple carriers, faster download rates can be achieved. To prepare for the transfer, the DRX cycles of the selected carriers are overridden, for example, by the base station instructing the user equipment to disable the DRX cycle of receivers configured to listen on the selected carriers. When the DRX cycle for a receiver is disabled, the receiver is put in an active state to listen for signals carried over the corresponding receiver. After overriding the DRX cycles, the base station transmits the download data over the selected data carriers.

In an embodiment, for each carrier selected to carrier the download data, the base station waits a predetermined delay before transmitting the download data on that carrier. The predetermined delay provides sufficient time for the user equipment to prepare itself to receive the download data over the corresponding carrier. For example, receivers currently in inactive state may require the predetermined delay to transition to the active state. If the user equipment includes fixed bandwidth receivers, the receiver corresponding to the carrier can be activated. If the user equipment includes an adaptable bandwidth receiver, the frequency range of the receiver may be adjusted to listen on the selected carrier.

In addition to selecting the multiple carriers and providing commands to override the DRX cycles for the carriers, the base station can provide other helpful information to the user equipment. For example, information can be provided regarding the resource blocks of the selected carriers allocated to carry the download data.

Advantages of the embodiments include at least the following. By having different DRX cycles on the different carriers in the multi-carrier system, the user equipment can turn off or otherwise put the receivers in a power conservation mode a majority of the time while still maintaining the capability to listen for signals the carriers. In so doing, it is still possible to receive data with reasonable high throughput while saving a significant amount of power consumption. Also, by having the possibility to supersede the DRX cycles of the carriers, it makes possible for a fast switch to a very high download throughput without waiting for DRX timing to time out on the respective carriers.

DESCRIPTION OF THE DRAWINGS

The foregoing and other objects, features, and advantages of the invention will be apparent from the following more particular description of preferred embodiments as illustrated in the accompanying drawings in which reference characters refer to the same parts throughout the various views. The drawings are not necessarily to scale, emphasis instead being placed upon illustrating the principles of the invention.

DETAILED DESCRIPTION

Figure 1:
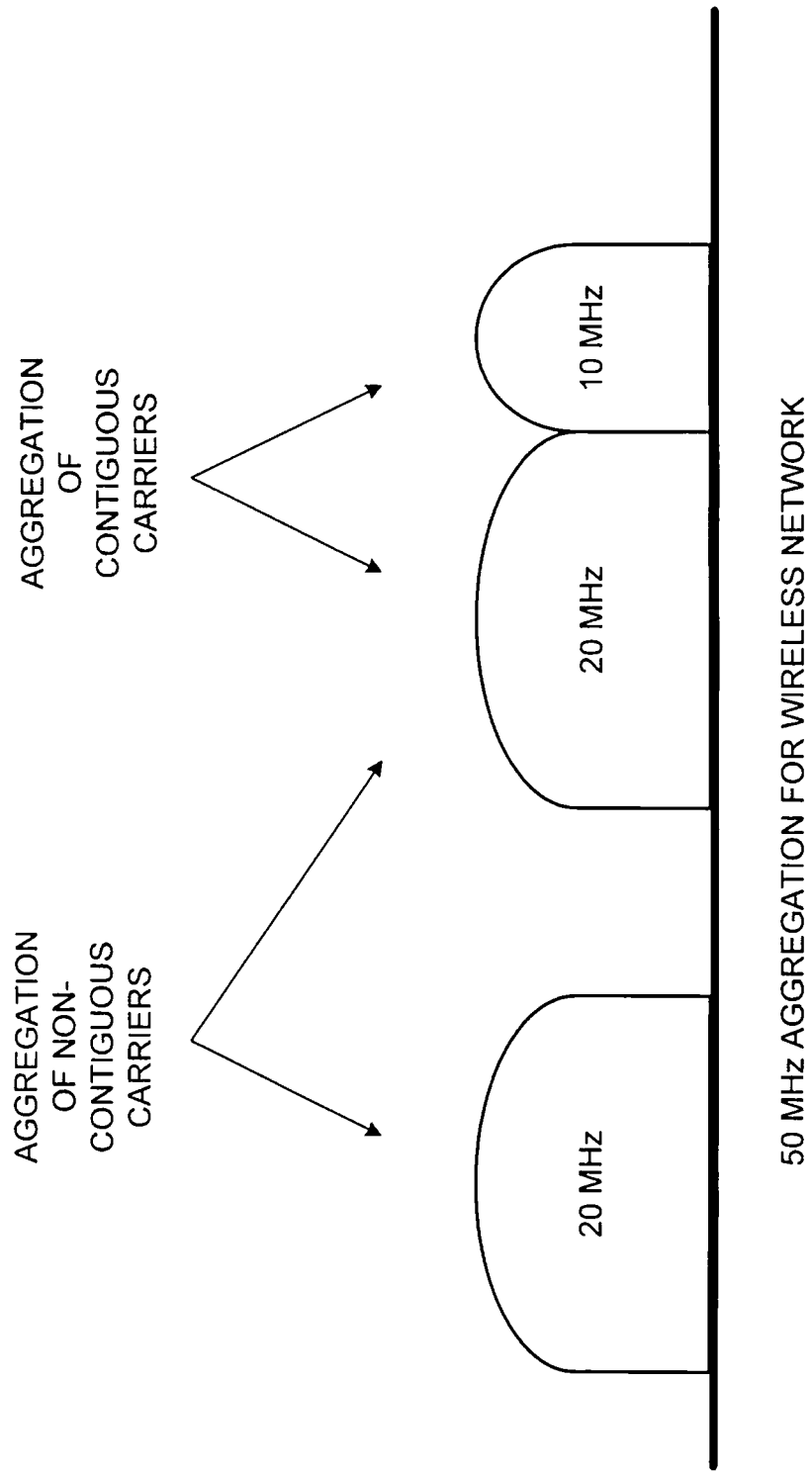
FIG. 1 illustrates an example aggregation of multiple narrow bandwidth carriers to achieve an aggregated wide bandwidth carrier.

In the following description, for purposes of explanation and not limitation, specific details are set forth such as particular architectures, interfaces, techniques, etc. in order to provide a thorough understanding of the present invention. However, it will be apparent to those skilled in the art that the present invention may be practiced in other embodiments that depart from these specific details. That is, those skilled in the art will be able to devise various arrangements which, although not explicitly described or shown herein, embody the principles of the invention and are included within its spirit and scope.

In some instances, detailed descriptions of well-known devices, circuits, and methods are omitted so as not to obscure the description of the present invention with unnecessary detail. All statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that block diagrams herein can represent conceptual views of illustrative circuitry embodying the principles of the technology. Similarly, it will be appreciated that any flow charts, state transition diagrams, pseudocode, and the like represent various processes which may be substantially represented in computer readable medium and so executed by a computer or processor, whether or not such computer or processor is explicitly shown.

The functions of the various elements including functional blocks labeled or described as "processors" or "controllers" may be provided through the use of dedicated hardware as well as hardware capable of executing software in association with appropriate software. When provided by a processor, the functions may be provided by a single dedicated processor, by a single shared processor, or by a plurality of individual processors, some of which may be shared or distributed. Moreover, explicit use of the term "processor" or "controller" should not be construed to refer exclusively to hardware capable of executing software, and may include, without limitation, digital signal processor (DSP) hardware, read only memory (ROM) for storing software, random access memory (RAM), and non-volatile storage.

Example of multi-carrier systems include HSPA (High Speed Packet Access) and LTE. In LTE, scaleable carrier bandwidths of 5, 10, 15, and 20 MHz are supported. Component carriers with bandwidths smaller than 5 MHz can be supported for increased flexibility. The downlink transmission scheme can be based on OFDM (orthogonal frequency division multiplex). In an OFDM system, the available carrier bandwidth is divided into a plurality of sub-carriers that are orthogonal to each other. Each of these sub-carriers is independently modulated by a low rate data stream. In LTE, the normal spacing between adjacent sub-carriers $\Delta f=15$ kHz. Sub-carrier spacing of $\Delta f=7.5$ kHz is also supported. Downlink access for user equipments is provided through OFDMA (orthogonal frequency division multiple access) in which different groupings of sub-carriers are allocated to different user equipments.

Data is allocated to the user equipments in terms of RBs (resource blocks) which is defined in both frequency and time domains. For the normal sub-carrier spacing $\Delta f=15$ kHz, a physical RB includes 12 consecutive sub-carriers in the frequency domain and 7 consecutive OFDM symbols in the time domain for a total of 94 REs (resource elements). Depending on the required download data transfer rate, each user equipment can be assigned one or more resource blocks in each TTI (transmission time interval) of 1 ms.

In the wireless network, the base station is able to transmit and the user equipment is able to receive signals (data and/or control) carried over a plurality of carriers. In a multi-carrier system such as LTE, the plurality of carriers need not be contiguous. That is, there can be at least one gap in a frequency spectrum represented by the plurality of carriers as illustrated in FIG. 1.

Figure 2:
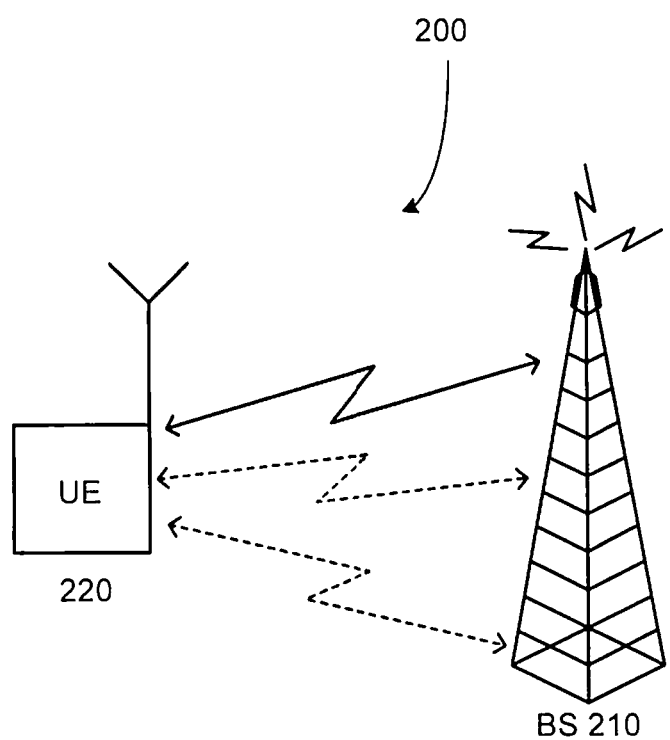
FIG. 2 illustrated a wireless multi-carrier network in which DRX functionalities are implemented.

FIG. 2 illustrates an example embodiment of a wireless multi-carrier network 200 in which DRX functionalities may be utilized. For simplicity of explanation, the network 200 includes one base station 210 and one user equipment 220. However, the concepts discussed are extendible to multiple base stations 210 and multiple user equipments 220. The bi-directional zigzag arrowed lines between the base station 210 and the user equipment 220 each represent a carrier of an aggregated wide bandwidth spectrum.

In this particular example, there are three carriers, one of which is being used as an anchor carrier (the solid arrowed line) and two of which are non-anchor carriers (the dashed arrowed lines). The anchor carrier carries control signals, such as the L1/L2 control signals, from the base station 210 to the user equipment 220. The control signals inform the user equipment 220 regarding specific downlink and uplink resources (such as identification of resource blocks of the carriers, scheduled for the user equipment), modulation scheme to be used, the user equipment transmission power level, and so on. The anchor carrier can also be used to carry commands from the base station 210 to the user equipment 220 such as commands to override the DRX cycles of the carriers including the DRX cycles of the non-anchor carriers. In FIG. 2, it is assumed that the user equipment 220 is equipped to receive signals carried over the plurality of the carriers.

In one specific example, the user equipment 220 may include at least three fixed bandwidth receivers each configured to listen for signals on one of the three carriers. During the inactive duration of the DRX cycles of the carriers, it is desirable for the user equipment 220 to put the receivers that correspond to the non-anchor carriers in a power conservation mode, i.e., to be in the inactive state, e.g., by turning the receivers off.

In another example, the user equipment 220 may include one or more adaptable bandwidth receivers. An adaptable bandwidth receiver is a receiver whose receiving frequency range can be dynamically adjusted as the need arises. In this instance, putting the receiver into the power conservation mode can include adjusting the frequency range of the receiver to exclude the non-anchor carriers during the inactive duration. By adjusting the frequency range, less power is consumed. Of course, the user equipment 220 can include both fixed and adaptable bandwidth receivers.

Figure 3:
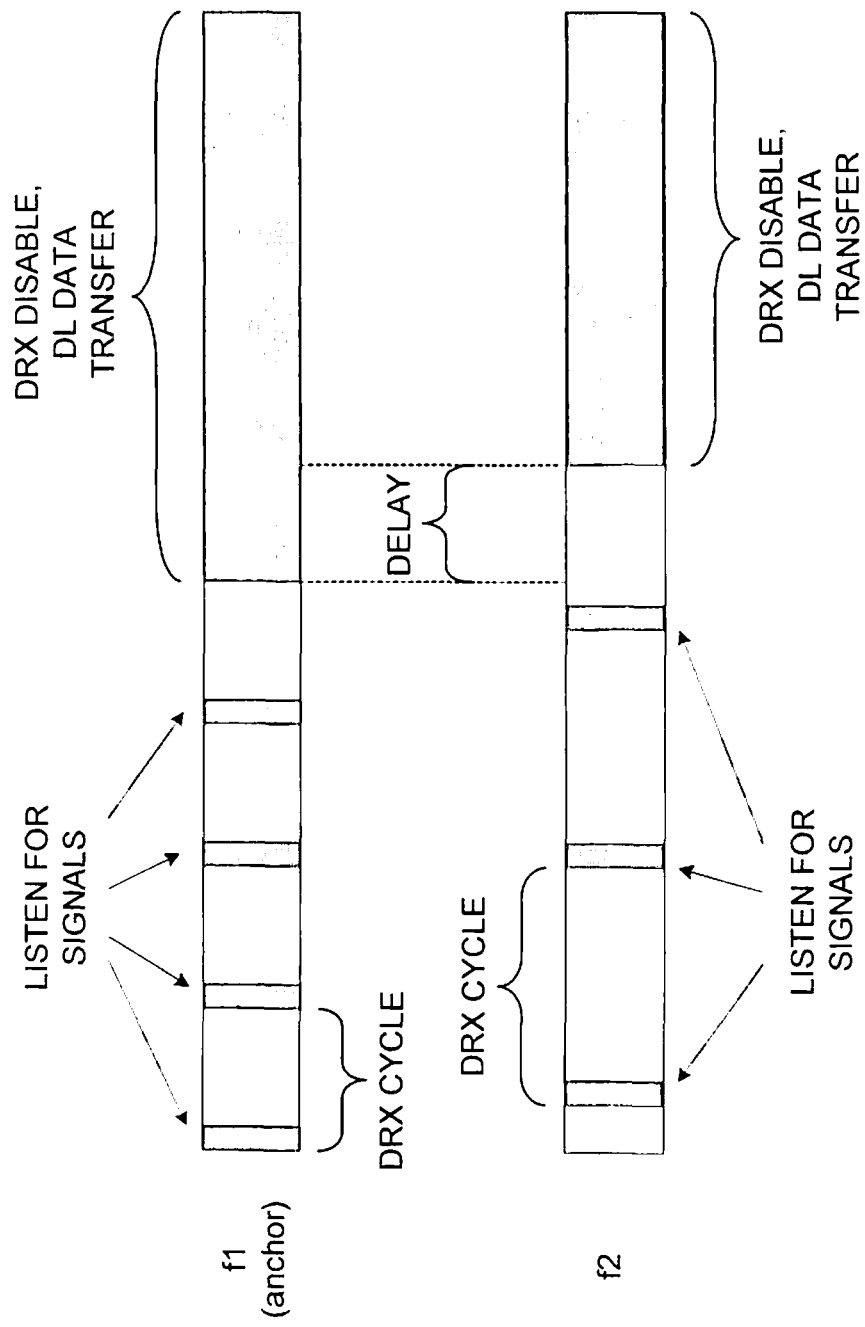
FIG. 3 illustrates an example timing effects of the DRX functionalities.

It is preferred that the anchor carriers have shorter DRX cycles than the non-anchor carriers. Anchor carriers are used to exchange control and measurement information which allows the system to operate in an acceptable manner. FIG. 3 illustrates an example DRX cycle for the anchor carrier F1 and a non-anchor carrier F2. For both carriers, the DRX cycle is represented as including an active duration (shaded region) and an inactive duration (white region). In the active duration, the user equipment 220 listens for signals, including control and command signals, from the base station on respective carriers. In the case of the user equipment 220 having multiple fixed bandwidth receivers, the receiver corresponding to each of the carriers is activated while in the active duration.

Note that the DRX cycles for the two carriers are independent of each other. That is, there need not be any relationship between the active and inactive durations of one carrier to those of another carrier.

When the base station 210 determines that it will transmit the download data over the carriers F1 and F2, the base station 210 notifies the user equipment 220 to disable the DRX cycles for both carriers F1 and F2. This notification is provided over the anchor carrier. In this particular instance, the download data can be transferred over the anchor carrier F1 immediately after instructing the user equipment 220 to disable the DRX cycle for the anchor carrier. However, if the non-anchor carrier F2 is in the inactive duration when the DRX disable command is provided, some delay may be required for the user equipment 220 to prepare, i.e., activate the receiver, so that the download data transmitted over the second carrier F2 can be received properly.

Figure 4:
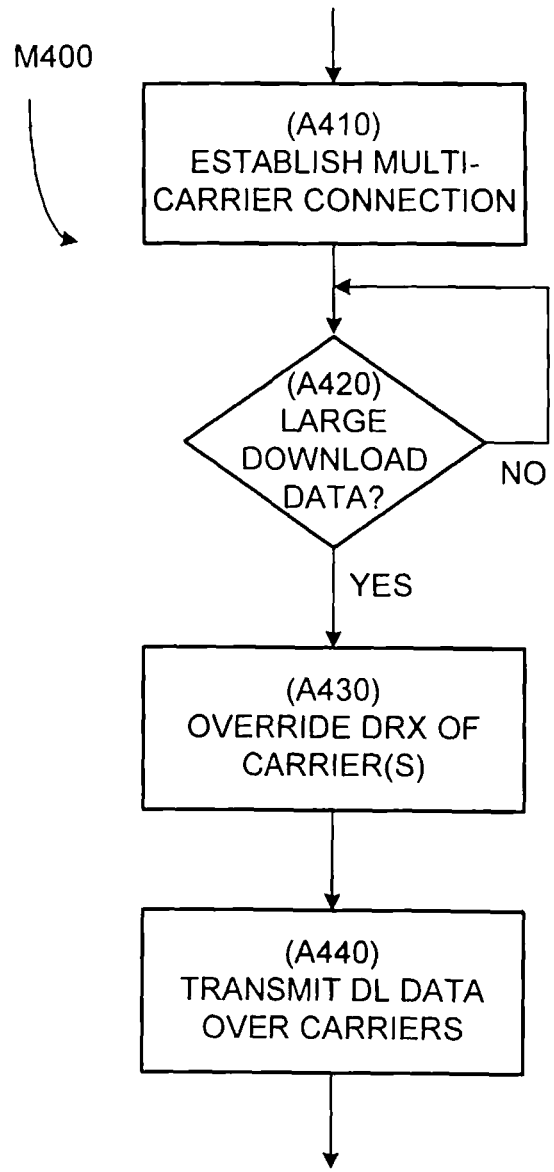
FIG. 4 illustrates an example method of utilizing the DRX functionalities.

FIG. 4 illustrates an example method M400 of utilizing the DRX functionalities in a multi-carrier wireless network. The method is from the perspective of the base station 210. In A410, the base station 210 establishes a connection with the user equipment 220 over a plurality of carriers. The base station (210) is capable of providing signals—control and/or data—to the user equipment (220) over the plurality of carriers.

In establishing the connection, the DRX cycle for each carrier is established as well. This can be accomplished through a negotiation between the base station 210 and the user equipment 220 or the base station 210 can decide on its own. The DRX cycle for each carrier is established such that it is independent of the DRX cycles of other carriers. As noted, the DRX cycle for a carrier determines the times in which the user equipment 220 listens for signals on the carrier to evaluate that carrier.

One or more of the plurality of carriers are anchor carriers which carry control signals from the base station 210 to the user equipment 220. The commands include commands to override the DRX cycles of the carriers including the DRX cycles of the non-anchor carriers. Due to the importance of the anchor carriers, it is preferred that the DRX cycles of the anchor carriers be shorter than the DRX cycles of the non-anchor carriers.

In FIG. 4, after the connection is established with the user equipment 220, the base station 210 determines whether there is a large amount of download data destined for the user equipment in A420. That is, the base station 210 makes a determination as to whether multiple carriers are required for transport. If so, then in A430, the base station 210 overrides the DRX cycles of multiple carriers selected to carry the download data. Then the base station 210 transmits the download data over the selected data carriers in A440.

Figure 5:
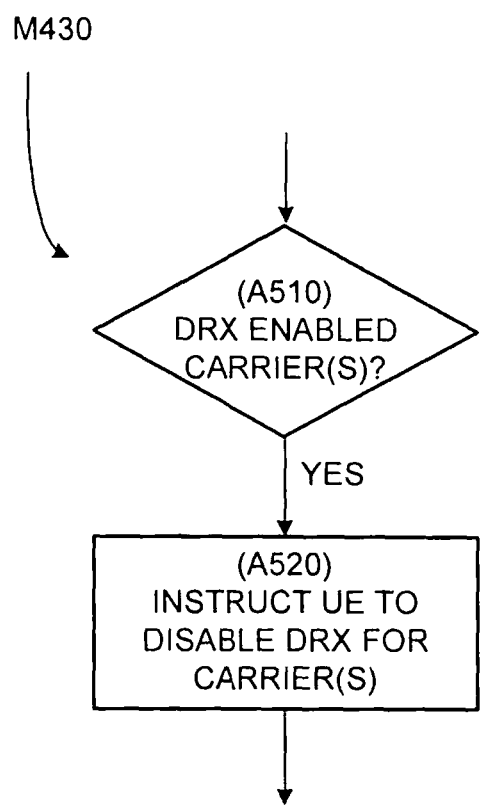
FIG. 5 illustrates an example method to override the DRX cycles of the carriers.

FIG. 5 illustrates an example method to implement A430 of overriding the DRX cycles of multiple carriers. In A510, the base station 210 determines whether any of the DRX cycles corresponding to the selected carriers are enabled. If so, in A520, the base station 210 provides instructions to the user equipment 220 to disable the DRX cycles of the selected carriers whose DRX cycles are currently enabled. The instructions to disable the DRX cycles can be provided over the anchor carriers. The base station 210 can provide instructions over the anchor carriers to disable the DRX cycles of the non-anchor carriers.

Figure 6:
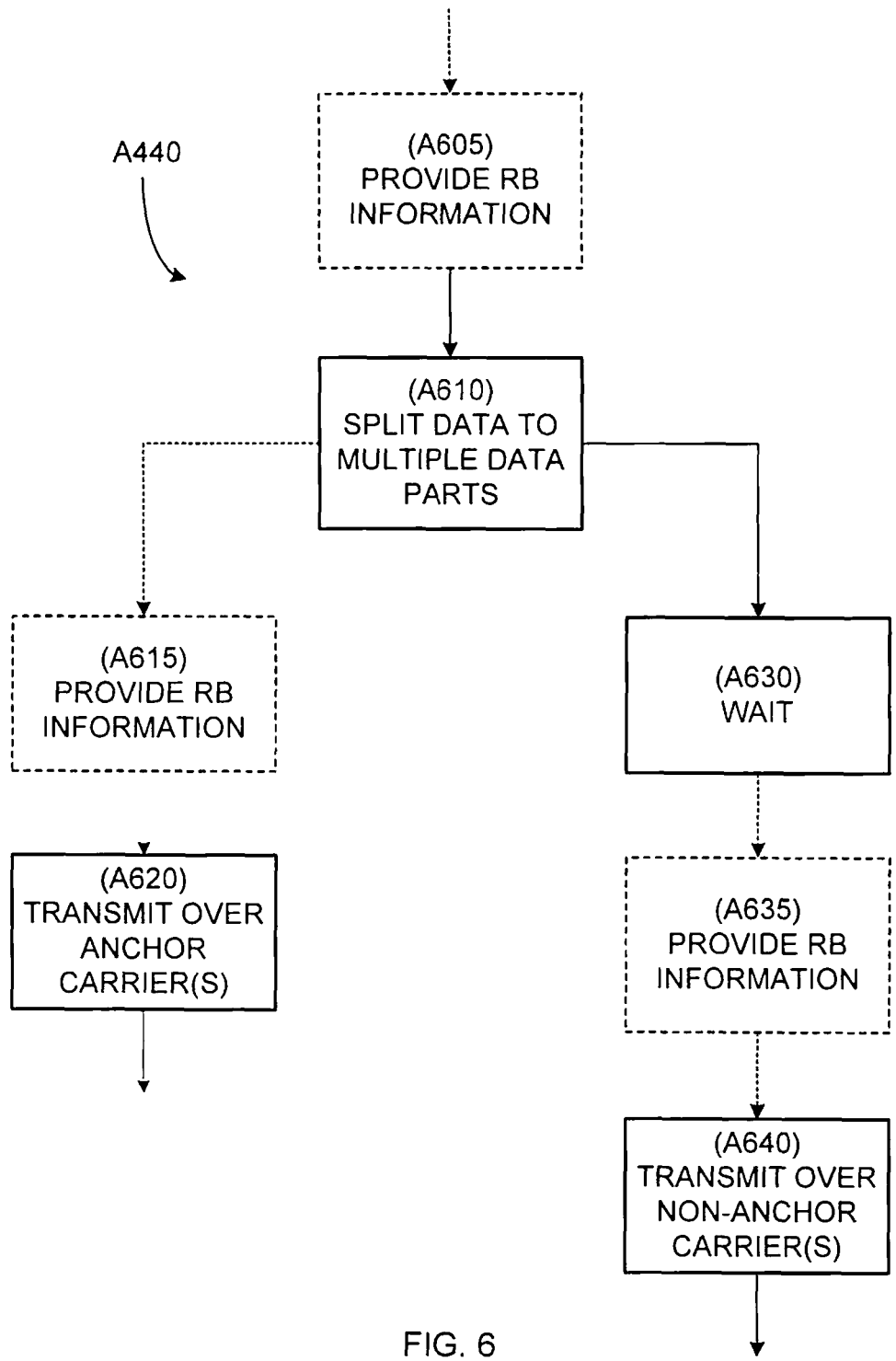
FIG. 6 illustrates an example method to transmit the download data over the carriers.

FIG. 6 illustrates a method the implement A440 of transmitting the download data over the selected carriers. In A610, the base station 210 splits the download data into two or more data parts where each data part corresponds to each of the selected carriers. In A620, the data parts corresponding to the anchor carriers are transmitted immediately. This is possible since the user equipment 220 is already actively listening on the anchor carriers.

In contrast, for the non-anchor carriers, the base station 210 waits a predetermined delay prior to transmitting the corresponding data over the non-anchor carriers. The predetermined delay allows the user equipment 220 to prepare to receive over the non-anchor carriers. For example, the predetermined delay may be required to switch the receiver from the inactive state to the active state. Different receivers may have different inactive-to-active transition times. Thus, each carrier can have a specific predetermined delay.

In one embodiment, information of the selected carriers and the RBs (resource blocks) of each selected carrier allocated to carry the download data can be provided over the anchor carriers. As an example, the base station 210 reserves a portion of a PDSCH (physical downlink shared channel) of the anchor carriers to provide the information. In another example, the base station 210 provides the information over a PDCCH (physical downlink control channel) of the anchor carrier. In yet another example, an identification of the selected carrier is provided over the anchor carrier (e.g., in the PDSCH or the PDCCH) and the information regarding the resource blocks of the selected carrier is provided over the selected carrier itself (e.g., in the PDCCH of the selected carrier).

In FIG. 6, this is reflected as steps A605, A615, or A635. This is simply to illustrate that providing the information to the user equipment 210 can occur anytime prior to the actual transmission of the download data over the selected carriers.

Figure 7:
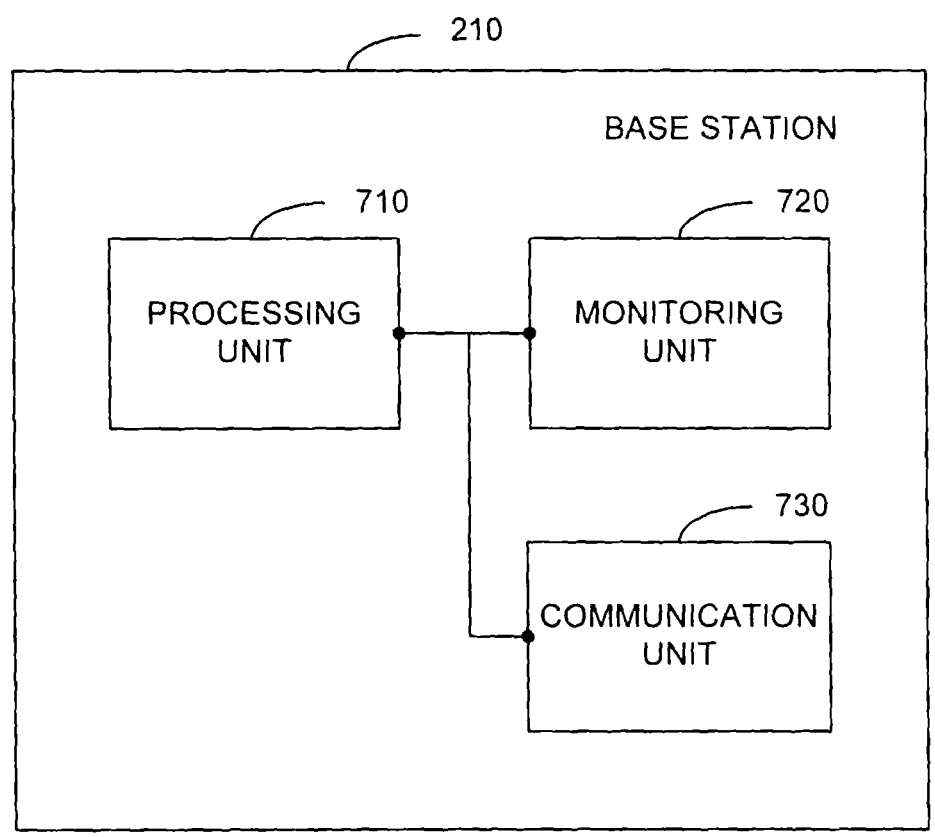
FIG. 7 illustrates an embodiment of a base station.

FIG. 7 illustrates the embodiment of the base station 210 of FIG. 2. The base station 210 includes a processing unit 710, a monitoring unit 720, and a communication unit 730. The monitoring unit 720 is arranged to monitor the carriers used by the base station 210. The communication unit 730 is arranged to communicate with the user equipment 220 over the carriers. The processing unit 710 is arranged to control the operations of the various devices of the base station 210 to perform the methods as described above.

Figure 8:
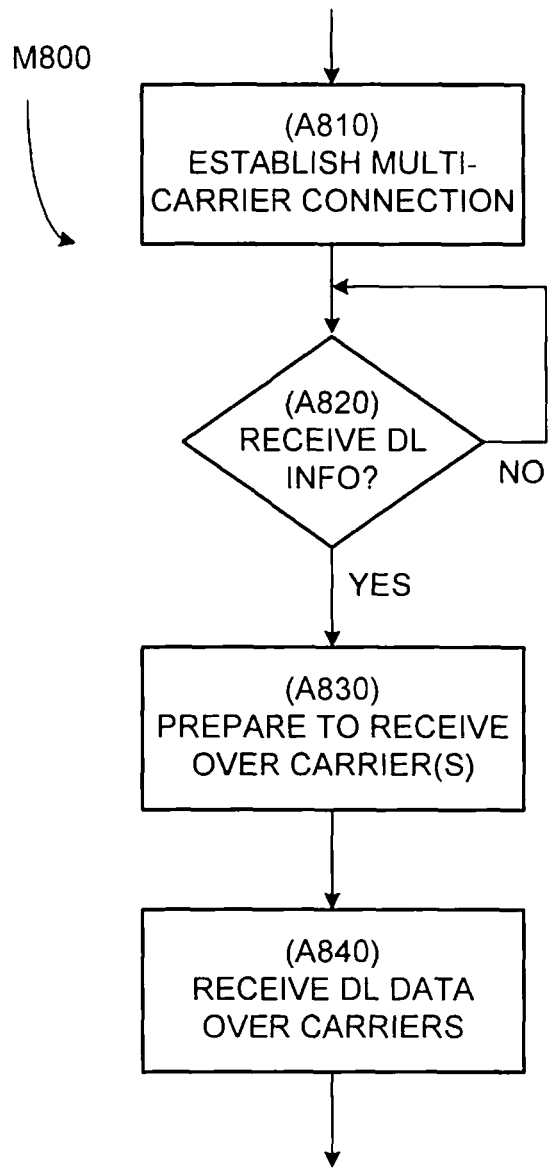
FIG. 8 illustrates an example method of utilizing the DRX functionalities from the perspective of the user equipment.

FIG. 8 illustrates an example method M800 to utilize the DRX functionalities from the perspective of the user equipment 220. In A810, the user equipment 220 establishes a connection with the base station 210 over the plurality of carriers. The user equipment 220 is capable of receiving signals from the base station (210) over the plurality of carriers. Also, the DRX cycle is established for each carrier that is independent of the DRX cycles of other carriers. The plurality of carriers can include one or more anchor carriers to which the user equipment 220 will listen to receive control signals as well as commands from the base station 210. The commands can include instructions to override the DRX cycles of the carriers.

In A820, the user equipment 220 receives information from the base station 210 as to whether the download data will be transported over multiple carriers. If so, then in A830, the user equipment 220 prepares the receivers to receive over the selected multiple carriers. For example, the DRX cycles of the receivers corresponding to the selected carriers can be activated. Then in A840, the download data is received over the selected carriers.

Figure 9:
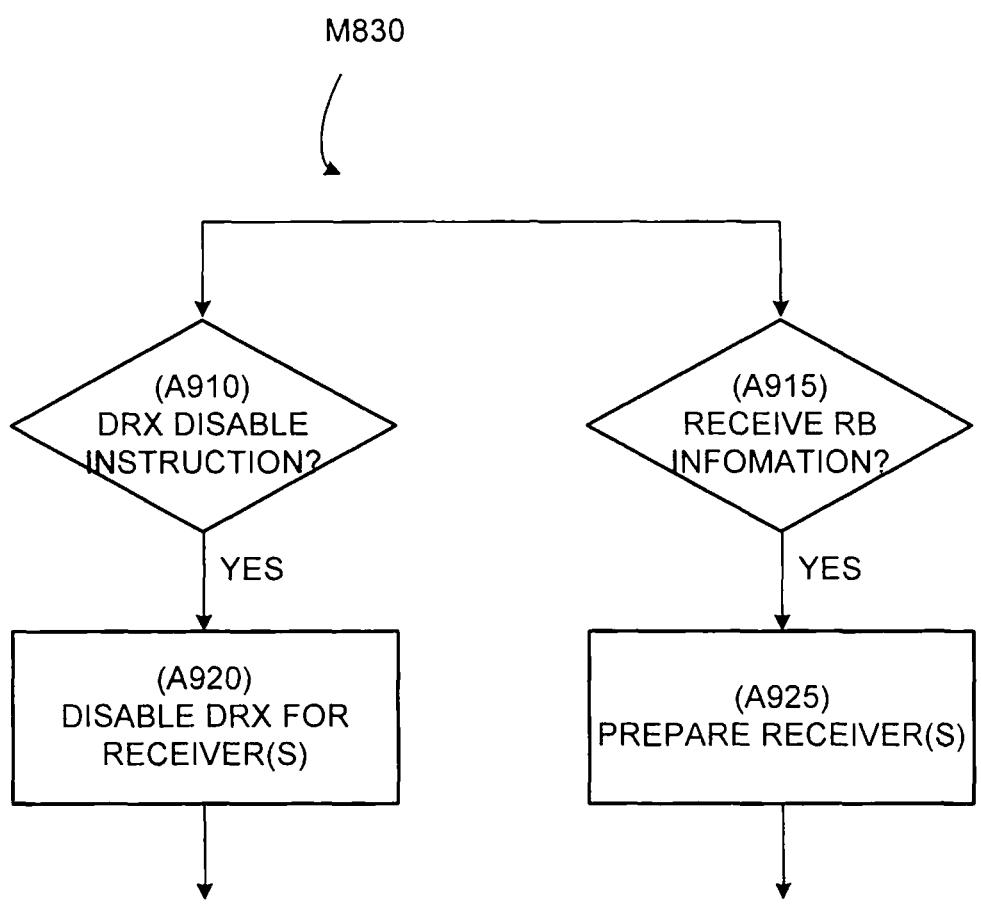
FIG. 9 illustrates an example method to prepare the user equipment to receive the download data from the base station over the carriers.

FIG. 9 illustrates a method to implement A830 of preparing the user equipment 220 to receive the download data over the selected carriers. In A910, the user equipment 220 determines if instructions to disable the DRX cycles for one or more of the selected carriers are received. If so, then in A920, the user equipment 220 carries out the process to disable the DRX cycles for the corresponding receivers. The instructions to disable the DRX cycles can be received on one or more of the anchor carriers.

In A915, the user equipment 220 determines whether information regarding resource blocks of the selected carriers allocated to transfer the download data has been received. If so, the user equipment 220 prepares the receivers to listen on these selected resource blocks accordingly in A925. The information on the resource blocks of each of the selected carriers can be provided either over the anchor carriers or over the selected carriers themselves. In one embodiment, the information is provided over the PDSCH (physical downlink shared channel) or the PDCCH (physical downlink control channel) of the one or more anchor carriers. In another embodiment, the information is provided over the PDCCH of the selected carrier itself.

Figure 10:
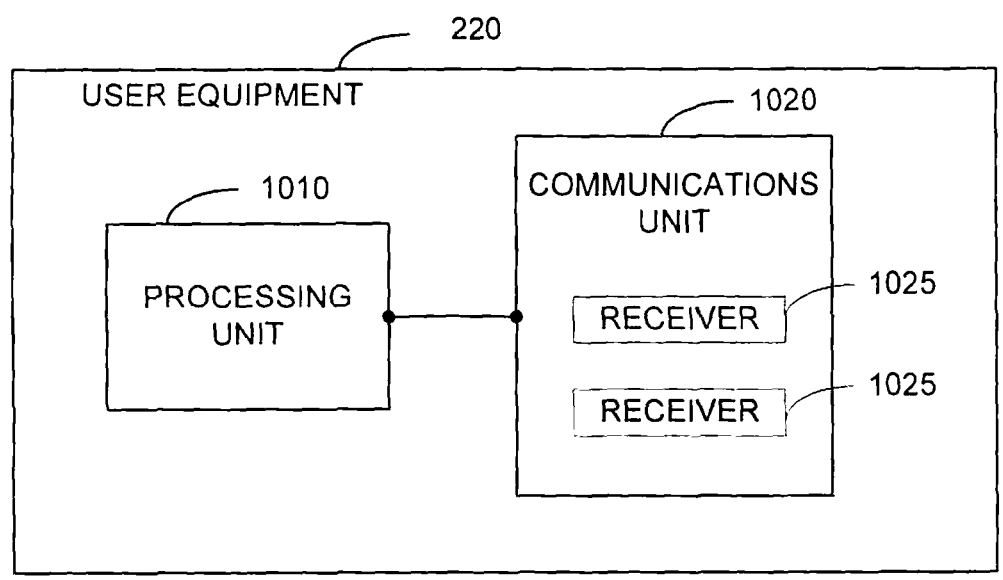
FIG. 10 illustrates an embodiment of the user equipment.

FIG. 10 illustrates an embodiment of the user equipment 220, which includes a processing unit 1010 and a communication unit 1020. The communication unit 1020 is arranged to communicate with the base station 210. The communication unit 1020 includes any combination of fixed narrow bandwidth and adaptable bandwidth receivers 1025. If only fixed bandwidth receivers are considered, then the communication unit 1020 is preferred to include a plurality of receivers 1025, where each receiver 1025 is configured to listen on one of the plurality of the carriers. If only adaptable bandwidth receivers are considered, then there can be one or more of these receivers 1025. If a combination is considered, then there can be one or more fixed bandwidth receivers and one or more adaptable bandwidth receivers. The processing unit 1010 is arranged to control the operations of the devices of the user equipment 220 to perform the methods as described above.

Although the description above contains many specificities, these should not be construed as limiting the scope of the invention but as merely providing illustrations of some of the presently preferred embodiments of this invention. Therefore, it will be appreciated that the scope of the present invention fully encompasses other embodiments which may become obvious to those skilled in the art, and that the scope of the present invention is accordingly not to be limited. All structural, and functional equivalents to the elements of the above-described preferred embodiment that are known to those of ordinary skill in the art are expressly incorporated herein by reference and are intended to be encompassed hereby. Moreover, it is not necessary for a device or method to address each and every problem described herein or sought to be solved by the present technology, for it to be encompassed hereby. Furthermore, no element, component, or method act in the present disclosure is intended to be dedicated to the public.

What is claimed is:

1. A method for operating a base station of a wireless network, comprising:
    establishing a connection with a user equipment over a plurality of carriers, the base station being capable of providing signals to the user equipment over the plurality of carriers,
    wherein for each of the plurality of carriers, a corresponding discontinuous reception (DRX) cycle is established that is independent of the DRX cycles of other carriers of the plurality of carriers, and
    wherein the DRX cycle for a carrier determines times in which the user equipment listens for signals on the carrier to evaluate that carrier, and
    wherein the DRX cycles of anchor carriers are shorter than the DRX cycles of non-anchor carriers.

2. The method of claim 1, wherein the plurality of carriers includes one or more anchor carriers used to provide control signals to the user equipment,
    wherein the one or more anchor carriers are used to send commands to the user equipment to override the DRX cycles of one or more carriers of the plurality of carriers including the DRX cycles of one or more non-anchor carriers.

3. The method of claim 1, further comprising:
    making a determination whether download data destined for the user equipment requires multiple carriers for transport;
    overriding the DRX cycles of the multiple carriers of the plurality of carriers selected for transport when the determination is made that the download data does require multiple carriers; and
    transmitting the download data to the user equipment over the selected carriers.

4. The method of claim 3, wherein the act of overriding the DRX cycles for the selected carriers comprises:
    making a determination whether the DRX cycles corresponding to one or more of the selected carriers are enabled; and
    providing instructions to the user equipment to disable the DRX cycle for each selected carrier whose DRX cycle is enabled,
    wherein the instructions to disable the DRX cycles are provided over one or more anchor carriers.

5. The method of claim 3, wherein the act of transmitting the download data over the selected carriers comprises:

splitting the download data into two or more data parts with each data part corresponding each of the selected carriers;

when the selected carriers include one or more anchor carriers, transmitting the data parts to the user equipment over the corresponding one or more selected anchor carriers; and when the selected carriers include one or more non-anchor carriers, waiting a predetermined delay prior to transmitting the data parts corresponding to each of the one or more selected non-anchor carriers to the user equipment over the corresponding one or more selected non-anchor carriers.

6. The method of claim 5, further comprising:
for each selected carrier, providing to the user equipment information regarding resource blocks of the selected carrier allocated to carry the download data, wherein the information regarding the resource blocks is provided to the user equipment on a physical downlink shared channel (PDSCH) or on a physical downlink control channel (PDCCH) of the one or more anchor carriers or on the PDCCH of the selected carrier.

7. The method of claim 1, wherein the plurality of carriers are either Long Term Evolution (LTE) or High Speed Packet Access, (HSPA) carriers.

8. A base station in a wireless network, comprising:
a communication unit configured to communicate with the user equipment; and
a processing unit configured to:
establish a connection with a user equipment over a plurality of carriers via the communication unit, the communication unit being capable of providing signals to the user over the plurality of carriers,
wherein for each carrier of the plurality of carriers, a corresponding discontinuous reception (DRX) cycle is established that is independent of DRX cycles of other carriers of the plurality of carriers, and
wherein the DRX cycle for a carrier determines times in which the user equipment listens for signals on the carrier to evaluate that carrier, and
wherein the DRX cycles of anchor carriers are shorter than the DRX cycles of non-anchor carriers.

9. The base station of claim 8, wherein the plurality of carriers includes one or more anchor carriers used to provide control signals to the user equipment, wherein the one or more anchor carriers are used to send commands to the user equipment to override the DRX cycles of one or more carriers of the plurality of carriers including the DRX cycles of one or more non-anchor carriers.

10. The base station of claim 8, wherein the processing unit is configured to:
make a determination whether download data destined for the user equipment requires multiple carriers for transport;
override, via the communication unit, the DRX cycles of the multiple carriers of the plurality of carriers selected for transport when the determination is made that the download data does require multiple carriers; and
transmit, via the communication unit the download data to the user equipment over the selected carriers.

11. The base station of claim 10, wherein the processing unit is to override the DRX cycles for the selected carriers by:
making a determination whether the DRX cycles corresponding to one or more of the selected carriers are enabled; and
providing instructions to the user equipment to disable the DRX cycle for each of the one or more of the selected carriers whose DRX cycle is enabled, wherein the processing unit (710) is arranged to transmit the instructions to the user equipment to disable the DRX cycles over one or more anchor carriers.

12. The base station of claim 10, wherein the processing unit (710) is configured transmit the download data over the selected carriers by:
splitting the download data into two or more data parts with each data part corresponding each of the selected carriers;
when the selected carriers include one or more anchor carriers, transmitting the data parts to the user equipment over the corresponding one or more selected anchor carriers; and
when the selected carriers include one or more non-anchor carriers, waiting a predetermined delay prior to transmitting the data parts corresponding to each of the one or more selected non-anchor carriers to the user equipment over the corresponding one or more selected non-anchor carriers.

13. The base station of claim 12, wherein the processing unit is configured to provide to the user equipment, for each selected carrier, information regarding resource blocks of the selected carrier allocated to carry the download data, and wherein the processing unit is arranged to provide to the user equipment the information regarding the resource blocks on a physical downlink shared channel (PDSCH) or on a physical downlink control channel (PDCCH) of the one or more anchor carriers or on the PDCCH of the selected carrier.

14. The base station of claim 8, wherein the plurality of carriers are either Long Term Evolution (LTE) or High Speed Packet Access (HSPA) carriers.

15. A method for operating user equipment of a wireless network, comprising:
establishing a connection with a base station over a plurality of carriers, the user equipment being capable of receiving signals from the base station over the plurality of carriers,
wherein for each carrier of the plurality of carriers, a corresponding discontinuous reception (DRX) cycle is established that is independent of DRX cycles of other carriers of the plurality of carriers, and
wherein the DRX cycle for each carrier determines times in which the user equipment listens for signals on the carrier to evaluate that carrier, and
wherein the DRX cycles of anchor carriers are shorter than the DRX cycles of non-anchor carriers.

16. The method of claim 15, wherein the plurality of carriers includes one or more anchor carriers used to receive control signals from the base station,
wherein the one or more anchor carriers are used to receive commands from the base station to override the DRX cycles of one or more carriers of the plurality of carriers including the DRX cycles of one or more non-anchor carriers.

17. The method of claim 15, further comprising:
receiving from the base station information on whether download data will be transported over multiple selected carriers;
preparing the user equipment to receive the download data when the information is received indicating that the download data will be transported over the selected carriers, wherein DRX cycles are disabled for one or more receivers to listen to communication signals carried over the selected carriers; and
receiving from the base station the download data over the selected carriers.

18. The method of claim 17, wherein the act of preparing the user equipment to receive the download data comprises:
  receiving from the base station instructions to disable the DRX cycle for one or more of the selected carriers, wherein the instructions to disable the DRX cycles are received over one or more anchor carriers used to receive control signals from the base station; and
  disabling the DRX cycles for each receiver adapted to listen to communication signals carried over each of the one or more selected carriers.

19. The method of claim 17, wherein the act of preparing the user equipment selected to receive the download data comprises:
  for each selected carrier, receiving from the base station information regarding resource blocks of the selected carrier allocated to carry the download data from the base station; and
  preparing the receivers adapted to listen to the selected carriers in accordance with the received information on the resource blocks,
  wherein the information regarding the resource blocks is received from the base station on a physical downlink shared channel (PDSCH) or on a physical downlink control channel (PDCCH) of the one or more anchor carriers or on the PDCCH of the selected carrier.

20. A user equipment of a wireless network, comprising:
  a communication unit configured to communicate with the base station, wherein the communication unit includes one or more receivers; and
  a processing unit configured to:
  establish a connection with a base station over a plurality of carriers via the communication unit, the communication unit being capable of receiving signals from the base station over the plurality of carriers,
  wherein for each carrier of the plurality of carriers, a corresponding discontinuous reception (DRX) cycle is established that is independent of a DRX cycle of other carriers of the plurality of carriers, and
  wherein the DRX cycle for a carrier determines times in which the user equipment listens for signals on the carrier to evaluate that carrier, and
  wherein the DRX cycles of anchor carriers are shorter than the DRX cycles of non-anchor carriers.

21. The user equipment of claim 20, wherein the plurality of carriers includes one or more anchor carriers used to receive control signals from the base station, wherein the one or more anchor carriers are used to receive commands from the base station to override the DRX cycles of one or more carriers of the plurality of carriers including the DRX cycles of one or more non-anchor carriers.

22. The user equipment of claim 20, wherein the processing unit is configured to:
  receive, via the communication unit, from the base station information on whether download data will be transported over multiple selected carriers;
  prepare the communications equipment to receive the download data when the information is received indicating that the download data will be transported over the selected carriers, wherein DRX cycles are disabled for one or more receivers adapted to listen to communication signals carried over the selected carriers; and
  receive from the base station the download data over the selected carriers.

23. The user equipment of claim 22, wherein the processing unit is configured to prepare the communications equipment to receive the download data by:
  receiving, via the communication unit, from the base station instructions to disable the DRX cycle for one or more of the selected carriers, wherein the instructions to disable the DRX cycles are received over one or more anchor carriers used to receive control signals from the base station; and
  disabling the DRX cycles for each receiver adapted to listen to communication signals carried over each of the one or more selected carriers.

24. The user equipment claim 22, wherein the processing unit is configured to prepare to receive the download data by:
  for each selected carrier, receiving from the base station information regarding resource blocks of the selected carrier allocated to carry the download data; and
  preparing the receivers adapted to listen to the selected carriers in accordance with the received information on the resource blocks, wherein the information regarding the resource blocks is received from the base station on a physical downlink shared channel (PDSCH) or on a physical downlink control channel (PDCCH) of the one or more anchor carriers or on the PDCCH of the selected carrier.

25. The user equipment of claim 22, wherein each receiver is a fixed bandwidth receiver or an adaptive bandwidth receiver.

* * * * *

UNITED STATES PATENT AND TRADEMARK OFFICE
CERTIFICATE OF CORRECTION

PATENT NO. : 8,526,377 B2  
APPLICATION NO. : 12/934207  
DATED : September 3, 2013  
INVENTOR(S) : Lindoff et al.

Page 1 of 2

It is certified that error appears in the above-identified patent and that said Letters Patent is hereby corrected as shown below:

On the title page, item (56), under "FOREIGN PATENT DOCUMENTS", in Column 2, Line 2, delete "EP A 1 845 668 10/2007".

On title page 2, item (56), under "FOREIGN PATENT DOCUMENTS", in Column 2, Line 1, delete "WO WO 2007/148198 12/2007".

In the Drawings

In Fig. 6, Sheet 6 of 10, delete "⌐━━━┴━━━┐" and insert -- ⌐━━━┴━━━┐ --, therefor.

In Fig. 9, Sheet 9 of 10, delete "⌐━━━━━━━━━┐" and insert -- ⌐━━━━━━━━━┐ --, therefor.

In Fig. 9, Sheet 9 of 10, in Box "(A915)", Line 3, delete "INFOMATION?" and insert -- INFORMATION? --, therefor.

Signed and Sealed this  
Sixteenth Day of September, 2014

Michelle K. Lee  
*Deputy Director of the United States Patent and Trademark Office*

CERTIFICATE OF CORRECTION (continued)
U.S. Pat. No. 8,526,377 B2

In the Claims

Column 9, Line 25, in Claim 7, delete "Access," and insert -- Access --, therefor.

Column 9, Line 59, in Claim 10, delete "unit" and insert -- unit, --, therefor.

Column 10, Line 2, in Claim 11, delete "unit (710)" and insert -- unit --, therefor.

Column 10, Line 6, in Claim 12, delete "unit (710)" and insert -- unit --, therefor.

Column 10, Line 64, in Claim 17, delete "receivers" and insert -- receivers adapted --, therefor.